(12) United States Patent
Huang

(10) Patent No.: US 7,072,249 B2
(45) Date of Patent: Jul. 4, 2006

(54) DIGITAL AUDIO SIGNAL PLAYBACK APPARATUS WITH SCRATCH EFFECT CONTROL DEVICE

(75) Inventor: J.Y. Huang, Tainan (TW)

(73) Assignee: Ya Horng Electronic Co., Ltd., Tainan (TW)

( * ) Notice: Subject to any disclaimer, the term of this patent is extended or adjusted under 35 U.S.C. 154(b) by 520 days.

(21) Appl. No.: 10/617,960

(22) Filed: Jul. 12, 2003

(65) Prior Publication Data

US 2004/0228222 A1 Nov. 18, 2004

(30) Foreign Application Priority Data

May 14, 2003 (TW) ............................... 092208802

(51) Int. Cl.
*H04B 1/20* (2006.01)
*G11H 7/00* (2006.01)

(52) U.S. Cl. ................................ 369/1; 369/4; 84/605

(58) Field of Classification Search .................... None
See application file for complete search history.

(56) References Cited

U.S. PATENT DOCUMENTS

| | | | | |
|---|---|---|---|---|
| 5,569,912 A | * | 10/1996 | Turk et al. | 250/231.14 |
| 5,763,874 A | * | 6/1998 | Luciano et al. | 250/231.14 |
| 6,535,462 B1 | * | 3/2003 | Liu | 369/4 |
| 6,541,690 B1 | * | 4/2003 | Segers, Jr. | 84/605 |
| 6,898,165 B1 | * | 5/2005 | Kikuchi | 369/53.3 |
| 2003/0029305 A1 | * | 2/2003 | Kent et al. | 84/645 |

* cited by examiner

*Primary Examiner*—Thang V. Tran
*Assistant Examiner*—Tawfik Goma
(74) *Attorney, Agent, or Firm*—Haynes Beffel & Wolfeld

(57) ABSTRACT

In a scratch effect control device for a digital audio signal playback apparatus, a control unit controls output of digital audio data recorded in a data recording medium and read by a data reading device in accordance with a first control signal representative of angular velocity and rotational direction of a first encoder disc and obtained from a first pick-up device, and a second control signal representative of angular velocity and rotational direction of a second encoder disc and obtained from a second pick-up device. The first encoder disc is mounted co-rotatably on an outer sleeve sleeved rotatably on an inner spindle and coupled co-axially to a lower platter member that is driven by a driving unit to rotate about an axis. The second encoder disc is mounted co-rotatably on the inner spindle which is coupled co-axially to an upper platter member that is superposed on the lower platter member.

7 Claims, 8 Drawing Sheets

DIGITAL AUDIO SIGNAL PLAYBACK APPARATUS WITH SCRATCH EFFECT CONTROL DEVICE

BACKGROUND OF THE INVENTION

1. Field of the Invention

The invention relates to a digital audio signal playback apparatus, more particularly to a digital audio signal playback apparatus with a scratch effect control device.

2. Description of the Related Art

FIG. 1 illustrates a conventional digital audio signal playback apparatus 1, which disclosed in U.S. Pat. No. 6,535,462, that includes a disc carrier 11 to be loaded with an optical disc (not shown), such as a compact disc, a laser pick-up head 12 for reading digital audio data recorded in the optical disc, a circuit unit 13 coupled electrically to the disc carrier 11 and the laser pick-up head 12, a control panel 14 coupled electrically to the circuit unit 13 for turntable control, a turntable unit 15 driven by a driving device 17 that is coupled electrically to the circuit unit 13, and a pick-up device 16 coupled electrically to the circuit unit 13 and interacting with the turntable unit so as to generate a control signal representative of angular velocity of the turntable unit 15.

The circuit unit 13 generally includes a high-frequency amplifier, a drive integrated circuit, a digital signal processor, a system microprocessor, DRAMs, a digital-to-analog converter, a low-pass filter, etc. The circuit unit 13 stores the digital audio data recorded in the optical disc, which is disposed on the disc carrier 11, and read by the laser pick-up head 12 in the DRAMs. At the same time, a disc jockey inputs control parameters via the control panel 14 to set angular velocity and rotation direction of the turntable unit 15. The circuit unit 13 then controls the driving device 17 to drive the turntable unit 15 to rotate in accordance with the control parameters such that the pick-up device 16 subsequently generates the control signal representative of angular velocity of the turntable unit 15. Finally, the circuit unit 13 controls output of the digital audio data stored in the DRAMs in accordance with the control signal from the pick-up device 16 so as to impart a scratch effect to the digital audio data.

The turntable unit 15 can be one of two types. As shown in FIG. 2, the turntable unit 15 may be one that includes a platter member 151, and a light-reflecting member 152 adhered on the platter member 151 and formed with a set of light-reflecting marks 153 which serves as a pick-up pattern, and which are arranged at a periphery of the light-reflecting member 152. However, the exposed light-reflecting member 152 easily peels away from the platter member 151 after a period of use, thereby necessitating frequent replacement of the turntable unit 15.

Referring to FIG. 3, another type of the turntable unit 15' is shown to include a lower platter member 151', an upper platter member 153' superposed on the lower platter member 151' and formed with a set of through holes 155 at a periphery thereof to serve as a pick-up pattern, and a light-reflecting interlayer 154 interposed between the lower and upper platter members 151', 153'. The pick-up device 16 interacts with the pick-up pattern so as to generate the control signal representative of the angular velocity of the turntable unit 15'. However, dust easily accumulates in the through holes 155 such that a desired scratch effect cannot be imparted to the digital audio data.

SUMMARY OF THE INVENTION

Therefore, the object of the present invention is to provide a digital audio signal playback apparatus with a durable scratch effect control device that can eliminate the aforesaid drawbacks of the prior art.

According to one aspect of the present invention, a digital audio signal playback apparatus comprises:

a housing having a top wall formed with an opening;

a data reading device mounted in the housing and operably associated with a data recording medium for reading digital audio data recorded in the data recording medium;

a pivot axle unit defining an axis, and including a rotatable inner spindle and an outer sleeve sleeved rotatably on the inner spindle, the outer sleeve having a platter connecting portion extending through the opening in the top wall of the housing so as to be disposed outwardly of the housing, and an encoder connecting portion disposed inside the housing, the inner spindle having a platter connecting section extending upwardly through the platter connecting portion of the outer sleeve, and an encoder connecting section extending downwardly through the encoder connecting portion of the outer sleeve;

a turntable unit disposed above the top wall of the housing, and including a lower platter member coupled co-axially to the platter connecting portion of the outer sleeve for co-rotation therewith, an upper platter member superposed on the lower platter member and coupled co-axially to the platter connecting section of the inner spindle for co-rotation therewith, and a coupling interlayer interposed between and in friction contact with the lower and upper platter members, the upper platter member being rotatable together with the lower platter member as a result of friction between the coupling interlayer and the upper and lower platter members;

a driving unit mounted in the housing and coupled to the lower platter member for driving rotation of the lower platter member about the axis;

a first encoder disc mounted co-rotatably on the encoder connecting portion of the outer sleeve and formed with a first pick-up pattern;

a second encoder disc mounted co-rotatably on the encoder connecting section of the inner spindle and formed with a second pick-up pattern;

a first pick-up device proximate to the first encoder disc and interacting with the first pick-up pattern for generating a first control signal representative of angular velocity and rotational direction of the first encoder disc;

a second pick-up device proximate to the second encoder disc and interacting with the second pick-up pattern for generating a second control signal representative of angular velocity and rotational direction of the second encoder disc; and a control unit connected electrically to the first and second pick-up devices and the data reading device, the control unit controlling output of the digital audio data read by the data reading device in accordance with the first and second control signals from the first and second pick-up devices so as to impart a scratch effect to the digital audio data.

According to another aspect of the present invention, there is provided a scratch effect control device for a digital audio signal playback apparatus. The playback apparatus has a data reading device operably associated with a data recording medium for reading digital audio data recorded in the data recording medium. The scratch effect control device comprises:

a pivot axle unit defining an axis, and including a rotatable inner spindle and an outer sleeve sleeved rotatably on the inner spindle, the outer sleeve having a platter connecting portion and an encoder connecting portion opposite to the platter connecting portion, the inner spindle having a platter connecting section extending through the platter connecting portion of the outer sleeve, and an encoder connecting section extending through the encoder connecting portion of the outer sleeve;

a turntable unit including a lower platter member coupled co-axially to the platter connecting portion of the outer sleeve for co-rotation therewith, an upper platter member superposed on the lower platter member and coupled co-axially to the platter connecting section of the inner spindle for co-rotation therewith, and a coupling interlayer interposed between and in friction contact with the lower and upper platter members, the upper platter member being rotatable together with the lower platter member as a result of friction between the coupling interlayer and the upper and lower platter members;

a driving unit coupled to the lower platter member for driving rotation of the lower platter member about the axis;

a first encoder disc mounted co-rotatably on the encoder connecting portion of the outer sleeve and formed with a first pick-up pattern;

a second encoder disc mounted co-rotatably on the encoder connecting section of the inner spindle and formed with a second pick-up pattern;

a first pick-up device proximate to the first encoder disc and interacting with the first pick-up pattern for generating a first control signal representative of angular velocity and rotational direction of the first encoder disc;

a second pick-up device proximate to the second encoder disc and interacting with the second pick-up pattern for generating a second control signal representative of angular velocity and rotational direction of the second encoder disc; and a control unit connected electrically to the first and second pick-up devices and adapted to control output of the digital audio data read by the data reading device in accordance with the first and second control signals from the first and second pick-up devices so as to impart a scratch effect to the digital audio data.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
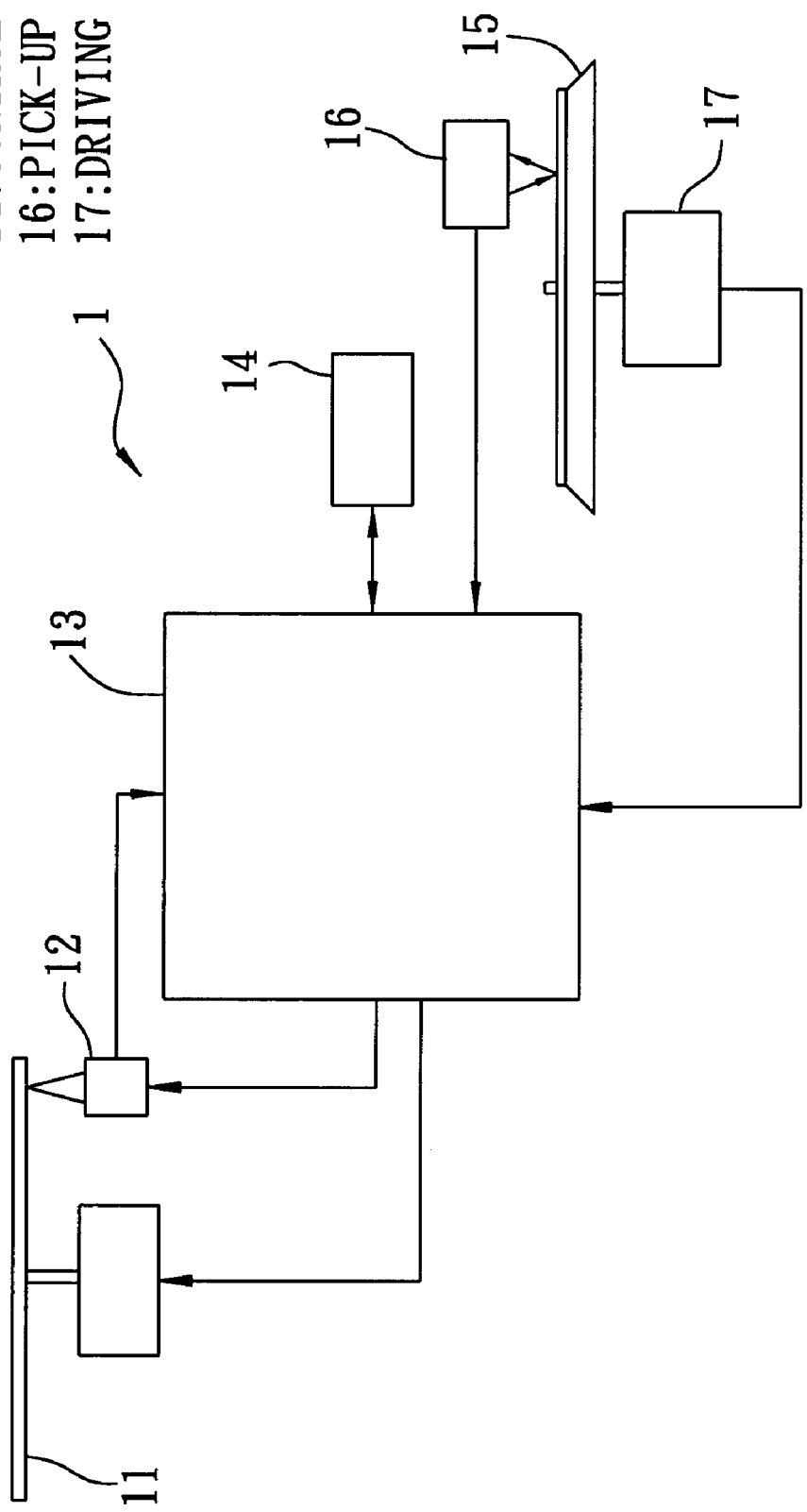
FIG. 1 is a schematic diagram showing a conventional digital audio signal playback apparatus.
Figure 2:
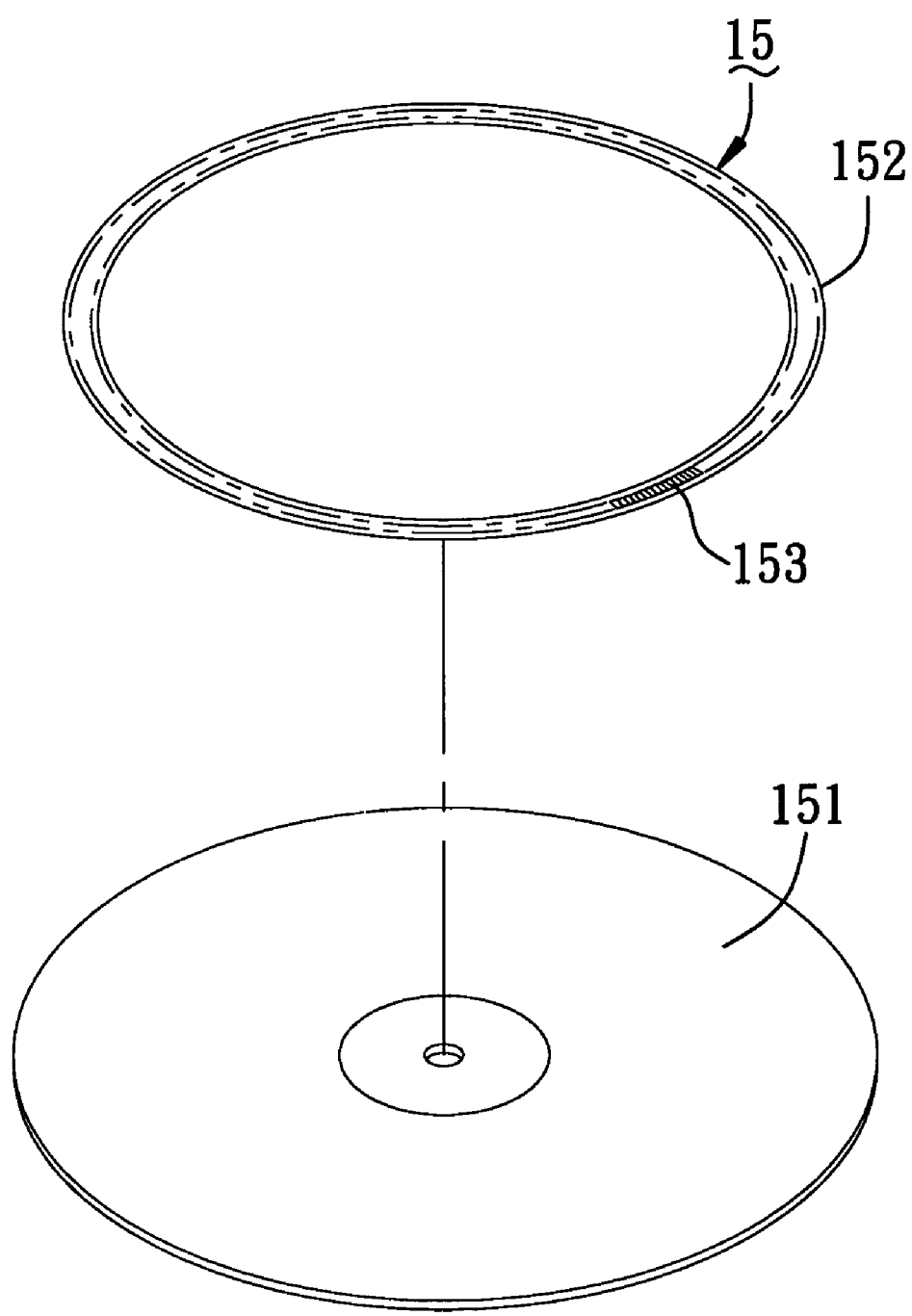
FIG. 2 is an exploded perspective view of an example of a turntable unit of the conventional playback apparatus.
Figure 3:
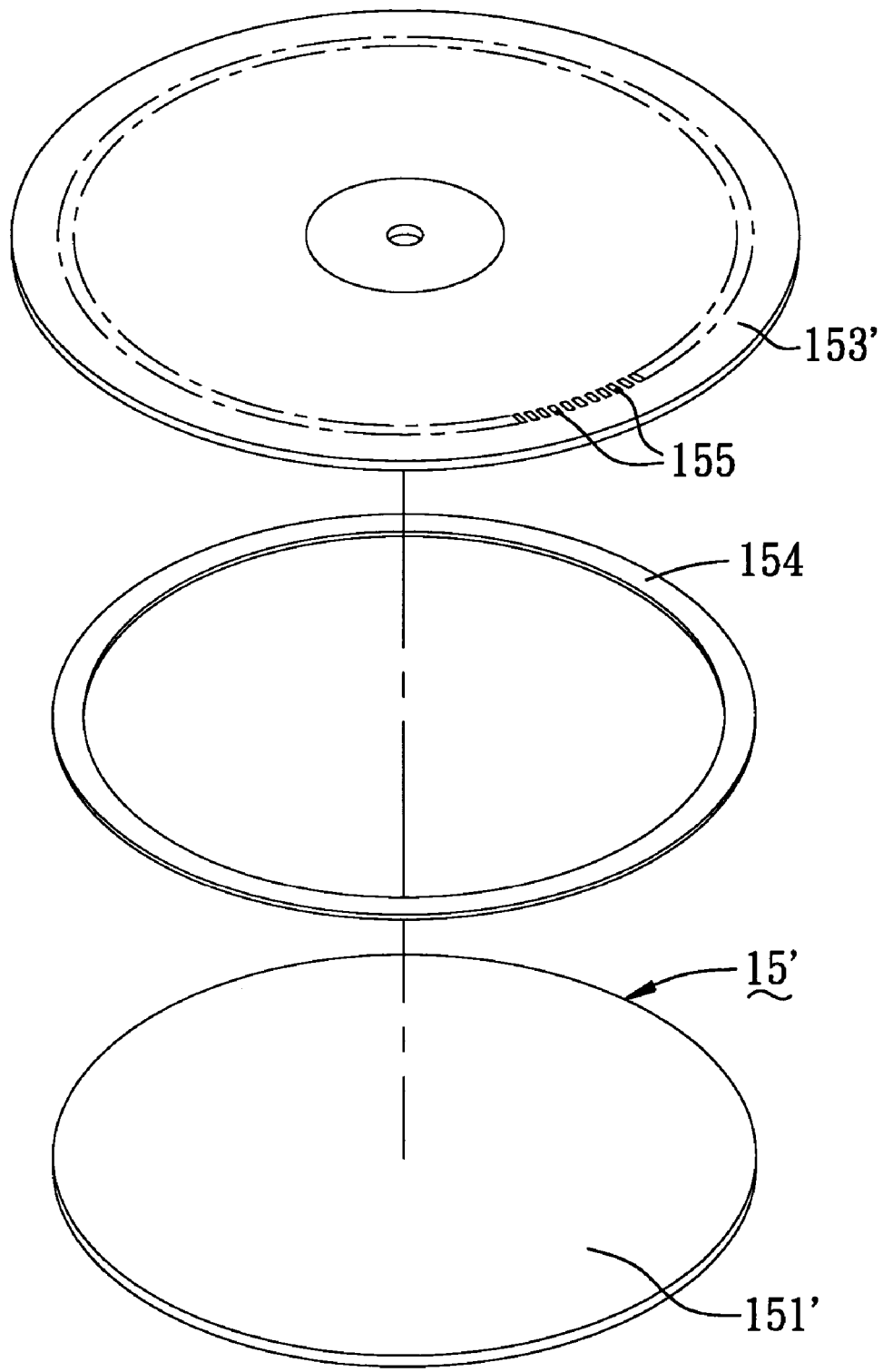
FIG. 3 is an exploded perspective view of another example of the turntable unit of the conventional playback apparatus.
Figure 4:
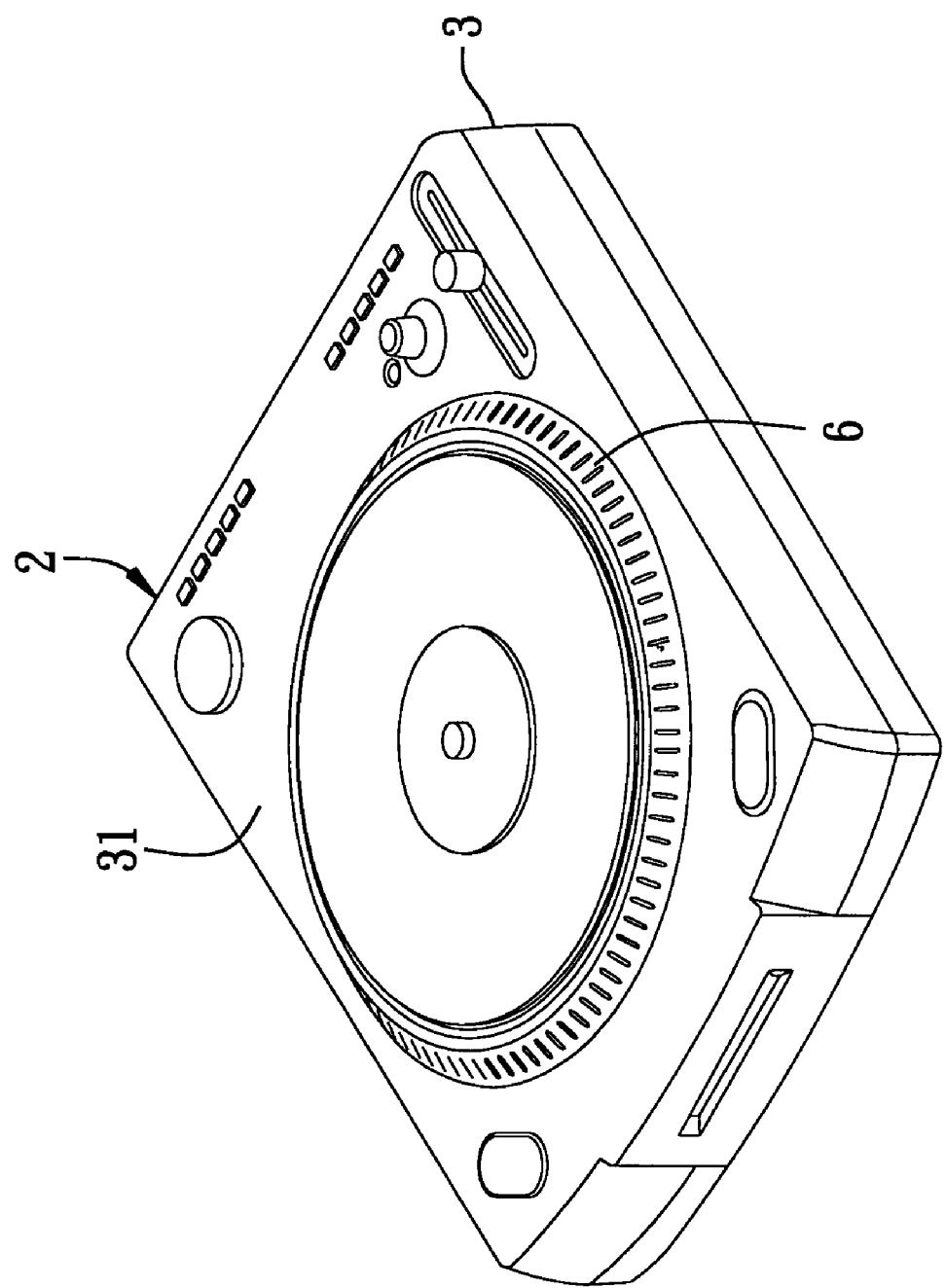
FIG. 4 is a perspective view showing the preferred embodiment of a digital audio signal playback apparatus according to the present invention.
Figure 5:
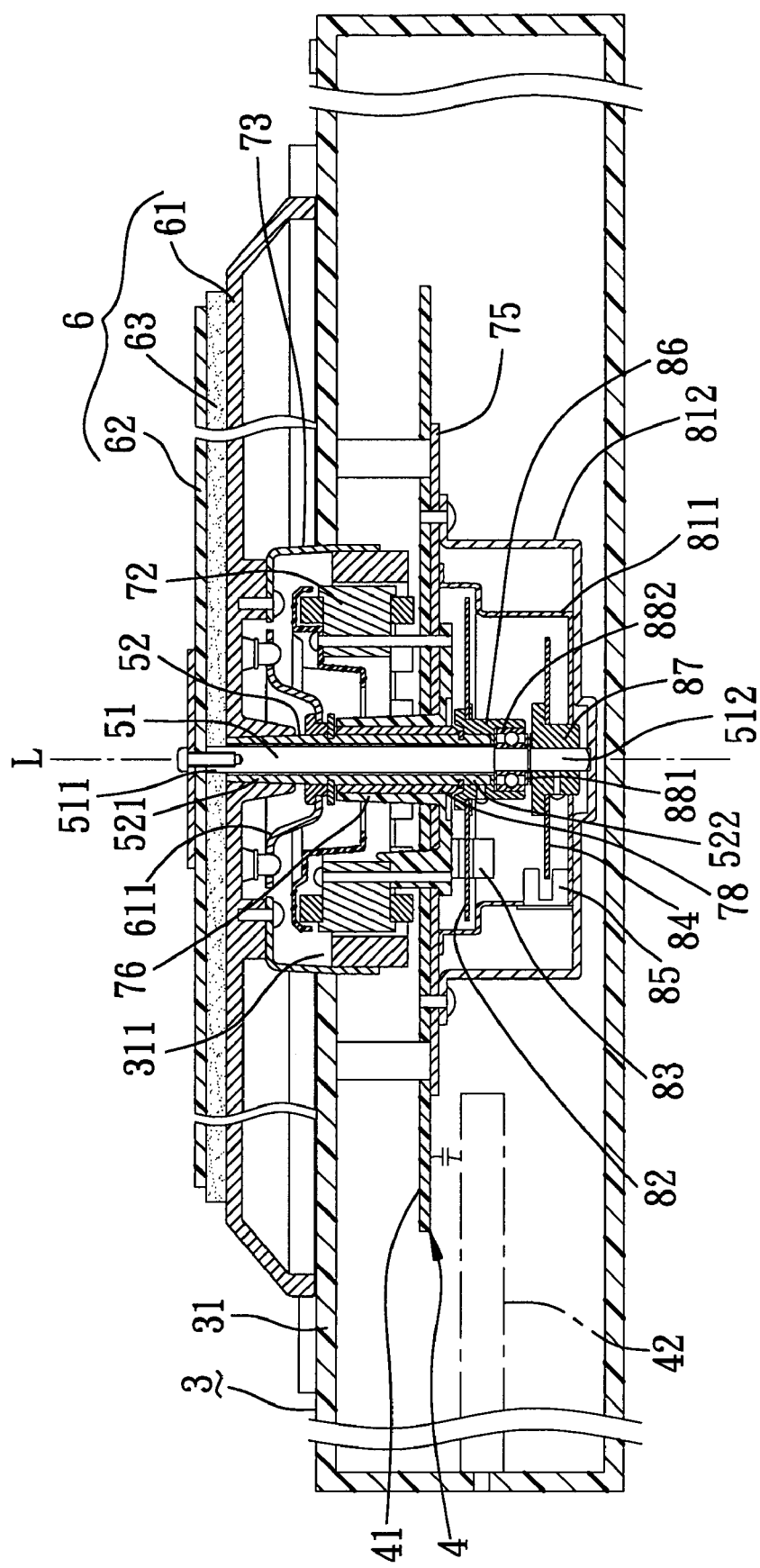
FIG. 5 is a schematic sectional view showing the preferred embodiment.
Figure 6:
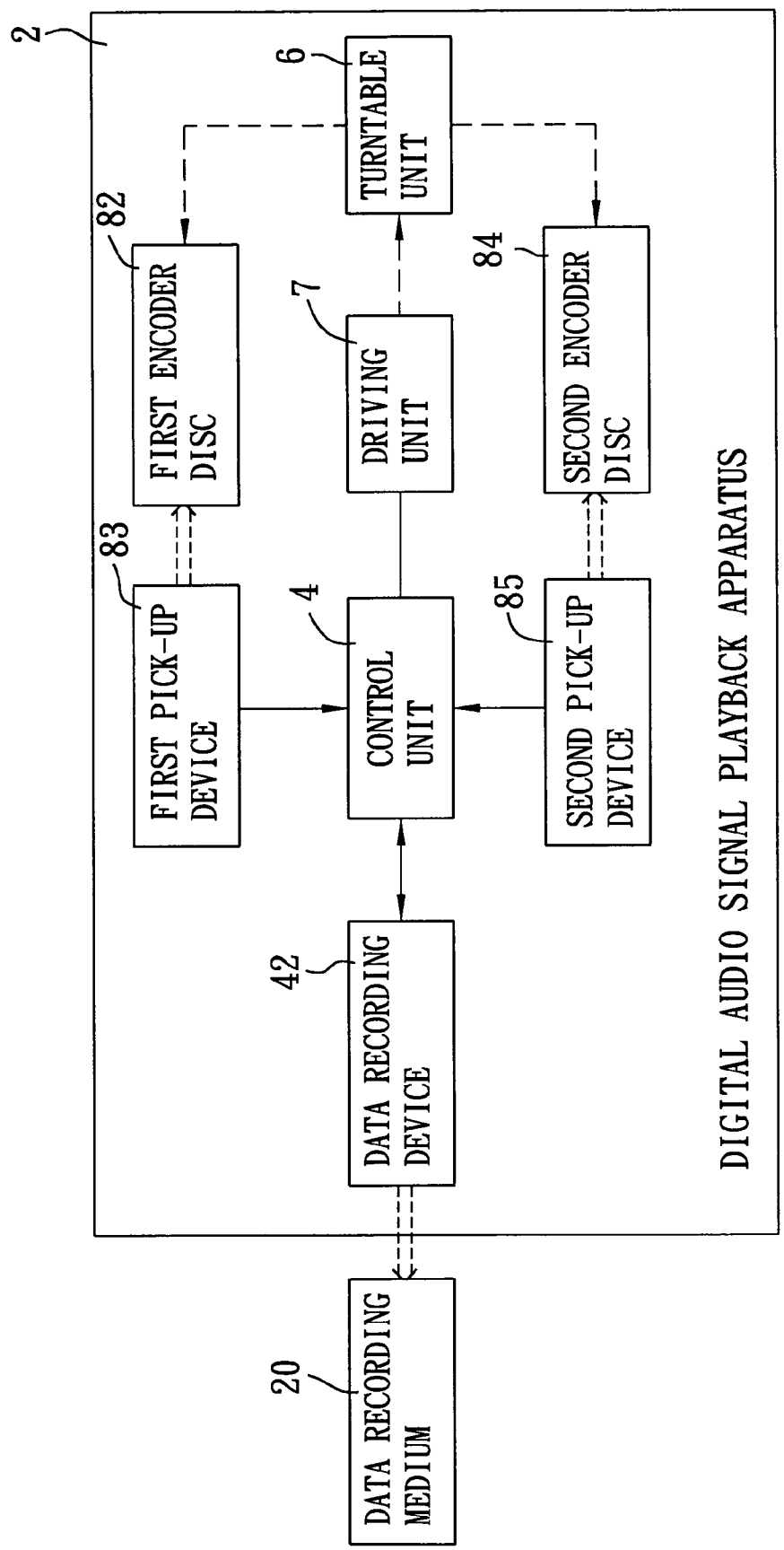
FIG. 6 is a schematic circuit block diagram illustrating the preferred embodiment.
Figure 7:
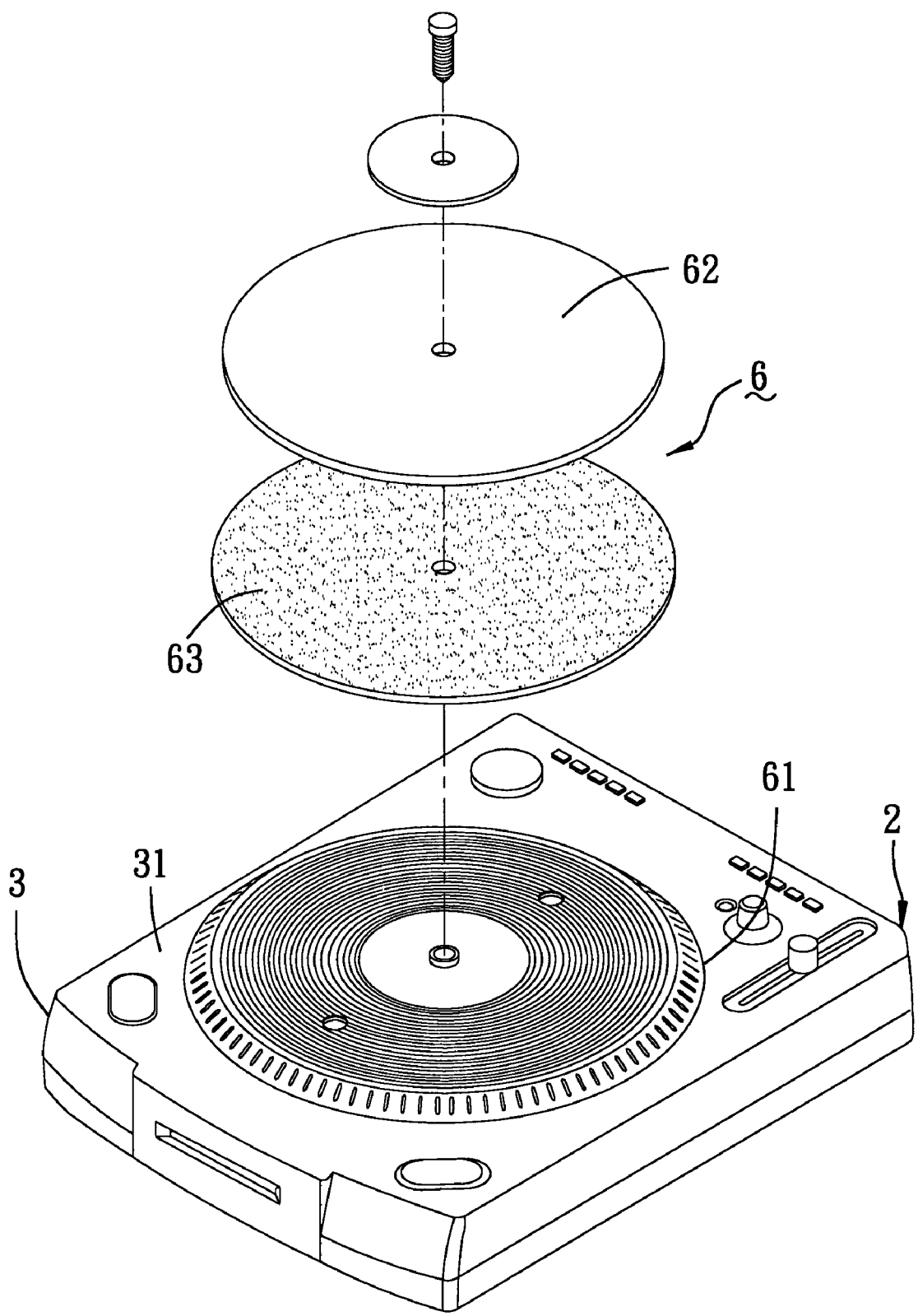
FIG. 7 is an exploded perspective view showing a turntable unit of the preferred embodiment.
Figure 8:
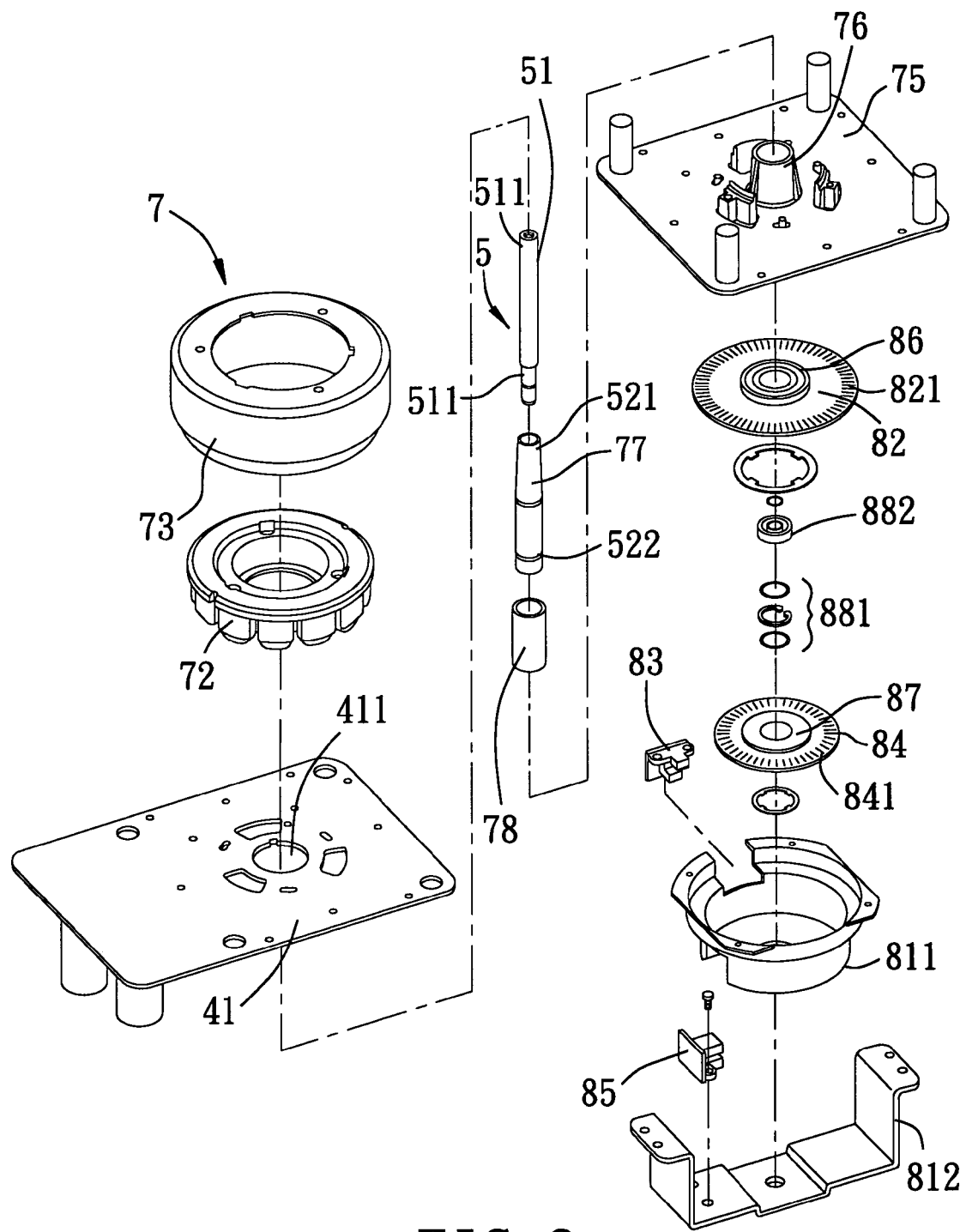
FIG. 8 is an exploded perspective view showing a pivot axle unit, a driving unit, first and second encoder discs, and first and second pick-up devices of a scratch effect control device of the preferred embodiment.

Referring to FIGS. 4 to 8, the preferred embodiment of a digital audio signal playback apparatus 2 according to the present invention is shown to include a housing 3, a data reading device 42, and a scratch effect control device. The scratch effect control device includes a pivot axle unit 5, a turntable unit 6, a driving unit 7, a first encoder disc 82, a second encoder disc 84, a first pick-up device 83, a second pick-up device 85, and a control unit 4.

The housing 3 has a top wall 31 formed with an opening 311.

The data reading device 42 is mounted in the housing 3, and is operably associated with a data recording medium 20 for reading digital audio data recorded in the data recording medium 20. In this embodiment, the data recording medium 20 is an optical disc, and the data reading device 42 is an optical reader capable of reading the optical disc.

The control unit 4 includes a circuit unit having a circuit board 41 formed with a high-frequency amplifier, a drive integrated circuit, a digital signal processor, a system microprocessor, DRAMs, a digital-to-analog converter, a low-pass filter, etc. on a circuit board 41. A supporting frame 75 is mounted on the circuit board 41 and is disposed below the circuit board 41. The supporting frame 75 is formed with an upright pivot seat 76 that extends through a through hole 411 in the circuit board 41. The pivot axle unit 5 extends rotatably through the pivot seat 76, defines an axis (L), and includes a rotatable inner spindle 51, and an outer sleeve 52 sleeved rotatably on the inner spindle 51. The outer sleeve 52 has a platter connecting portion 521 extending through the opening 311 in the top wall 31 of the housing 3 so as to be disposed outwardly of the housing 3, and an encoder connecting portion 522 disposed inside the housing 3. The inner spindle 51 has a platter connecting section 511 extending upwardly through the platter connecting portion 521 of the outer sleeve 52, and an encoder connecting section 512 extending downwardly through the encoder connecting portion 522 of the outer sleeve 52. In this embodiment, a heat-dissipating sleeve 78, which is made of copper, is disposed between the pivot seat 76 and the pivot axle unit 5 so as to dissipate heat generated during rotation of the pivot axle unit 5.

The turntable unit 6 is disposed above the top wall 31 of the housing 3, and includes a lower platter member 61, an upper platter member 62 and a coupling interlayer 63. The lower platter member 61, which is made of aluminum, is coupled co-axially to the platter connecting portion 521 of the outer sleeve 52 for co-rotation therewith (see FIG. 5). A coupling member 611 is mounted on the bottom side of the lower platter member 61, and extends into the opening 311 in the top wall 31 of the housing 3. The upper platter member 62, which is made of a plastic material so as to provide a tactile feel similar to a vinyl record on an audio turntable, is superposed on the lower platter member 61, and is coupled co-axially to the platter connecting section 511 of the inner spindle 51 for co-rotation therewith. The coupling interlayer 63, which is made a non-woven material, is interposed between and is in friction contact with the lower and upper platter members 61, 62. The upper platter member 62 is rotatable together with the lower platter member 61 as a result of friction between the coupling interlayer 63 and the upper and lower platter members 61, 62.

The driving unit 7 is mounted in the housing 3 and is coupled to the lower platter member 61 for driving rotation of the lower platter member 61 about the axis (L). In this embodiment, the driving unit 7 includes an electromagnet 72 mounted on and coupled electrically to the circuit board 41, and a magnetic member 73 disposed around the electromagnet 72, suspended from the lower platter member 61, and driven by the electromagnet 72 to rotate about the axis (L) when the electromagnet 72 is excited.

The first encoder disc 82 is mounted co-rotatably on the encoder connecting portion 522 of the outer sleeve 52 by means of a mounting seat 86 formed thereon, a bearing member 882 and a set of washers 881, and is formed with a first pick-up pattern 821. In this embodiment, the first encoder disc 82 is disposed in a receiving seat 811 that is fixed to the supporting frame 75.

The second encoder disc 84 is mounted co-rotatably on the encoder connecting section 512 of the inner spindle 51 by means of a mounting seat 87 formed thereon, and is formed with a second pick-up pattern 841. In this embodiment, the second encoder disc 84 is disposed in the receiving seat 811.

The first pick-up device 83, which is mounted on the supporting frame 75, is proximate to the first encoder disc 82, and interacts with the first pick-up pattern 821 for generating a first control signal representative of angular velocity and rotational direction of the first encoder disc 82.

The second pick-up device 85, which is mounted on a mounting frame 812 that is fixed to the supporting frame 75, is proximate to the second encoder disc 84, and interacts with the second pick-up pattern 841 for generating a second control signal representative of angular velocity and rotational direction of the second encoder disc 84. Since the first and second pick-up devices 83, 85 are known in the art, a detailed description of the same is omitted herein for the sake of brevity.

The control unit 4 is connected electrically to the first and second pick-up devices 83, 85 and the data reading device 42. The control unit 4 controls output of the digital audio data read by the data reading device 42 in accordance with the first and second control signals from the first and second pick-up devices 83, 85 so as to impart a scratch effect to the digital audio data.

As such, when the magnetic member 73 is driven by the excited electromagnet 72 to rotate about the axis (L), the lower and upper platter members 61, 62 rotate together with the magnetic member 73, and the first and second encoder discs 82, 84 co-rotate with the outer sleeve 52 and the inner spindle 51, respectively. In order to generate a scratch effect, a disc jockey can manipulate the upper platter member 62 in a manner similar to a conventional vinyl record on an audio turntable so as to change rotational velocity or rotational direction of the upper platter member 62 and the second encoder disc 84 relative to the lower platter member 61 and the first encoder disc 82. At this time, the second control signal generated by the second pick-up device 85 differs from the first control signal generated by the first pick-up device 83 so that the control unit 4 can control output of the digital audio data read by the data reading device 42 in accordance with the first and second control signals to impart the scratch effect to the digital audio data.

Since the first and second encoder discs 82, 84 and the first and second pick-up devices 83, 85 are disposed in the housing 3, accumulation of dust thereon can be prevented.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A digital audio signal playback apparatus, comprising:
   a housing having a top wall formed with an opening;
   a data reading device mounted in said housing and operably associated with a data recording medium for reading digital audio data recorded in the data recording medium;
   a pivot axle unit defining an axis, and including a rotatable inner spindle and an outer sleeve sleeved rotatably on said inner spindle,
   said outer sleeve having a platter connecting portion extending through said opening in said top wall of said housing so as to be disposed outwardly of said housing, and an encoder connecting portion disposed inside said housing,
   said inner spindle having a platter connecting section extending upwardly through said platter connecting portion of said outer sleeve, and an encoder connecting section extending downwardly through said encoder connecting portion of said outer sleeve;
   a turntable unit disposed above said top wall of said housing, and including a lower platter member coupled co-axially to said platter connecting portion of said outer sleeve for co-rotation therewith, an upper platter member superposed on said lower platter member and coupled co-axially to said platter connecting section of said inner spindle for co-rotation therewith, and a coupling interlayer interposed between and in friction contact with said lower and upper platter members, said upper platter member being rotatable together with said lower platter member as a result of friction between said coupling interlayer and said upper and lower platter members;
   a driving unit mounted in said housing and coupled to said lower platter member for driving rotation of said lower platter member about said axis;
   a first encoder disc mounted co-rotatably on said encoder connecting portion of said outer sleeve and formed with a first pick-up pattern;
   a second encoder disc mounted co-rotatably on said encoder connecting section of said inner spindle and formed with a second pick-up pattern;
   a first pick-up device proximate to said first encoder disc and interacting with said first pick-up pattern for generating a first control signal representative of angular velocity and rotational direction of said first encoder disc;
   a second pick-up device proximate to said second encoder disc and interacting with said second pick-up pattern for generating a second control signal representative of angular velocity and rotational direction of said second encoder disc; and
   a control unit connected electrically to said first and second pick-up devices and said data reading device, said control unit controlling output of the digital audio data read by said data reading device in accordance with the first and second control signals from said first and second pick-up devices so as to impart a scratch effect to the digital audio data.

2. The digital audio signal playback apparatus as claimed in claim 1, wherein said driving unit includes an electromagnet, and a magnetic member disposed around said electromagnet, suspended from said lower platter member, and driven by said electromagnet to rotate about said axis when said electromagnet is excited.

3. The digital audio signal playback apparatus as claimed in claim 1, further comprising an upright pivot seat disposed in said housing, said pivot axle unit extending rotatably through said pivot seat.

4. The digital audio signal playback apparatus as claimed in claim 3, further comprising a heat-dissipating sleeve disposed between said pivot seat and said pivot axle unit.

5. The digital audio signal playback apparatus as claimed in claim 1, wherein said data reading device is an optical reader capable of reading an optical disc.

6. A scratch effect control device for a digital audio signal playback apparatus, the playback apparatus having a data reading device operably associated with a data recording medium for reading digital audio data recorded in the data recording medium, said scratch effect control device comprising:
   a pivot axle unit defining an axis, and including a rotatable inner spindle and an outer sleeve sleeved rotatably on said inner spindle,
      said outer sleeve having a platter connecting portion and an encoder connecting portion opposite to said platter connecting portion,
      said inner spindle having a platter connecting section extending through said platter connecting portion of said outer sleeve, and an encoder connecting section extending through said encoder connecting portion of said outer sleeve;
   a turntable unit including a lower platter member coupled co-axially to said platter connecting portion of said outer sleeve for co-rotation therewith, an upper platter member superposed on said lower platter member and coupled co-axially to said platter connecting section of said inner spindle for co-rotation therewith, and a coupling interlayer interposed between and in friction contact with said lower and upper platter members, said upper platter member being rotatable together with said lower platter member as a result of friction between said coupling interlayer and said upper and lower platter members;
   a driving unit coupled to said lower platter member for driving rotation of said lower platter member about said axis;
   a first encoder disc mounted co-rotatably on said encoder connecting portion of said outer sleeve and formed with a first pick-up pattern;
   a second encoder disc mounted co-rotatably on said encoder connecting section of said inner spindle and formed with a second pick-up pattern;
   a first pick-up device proximate to said first encoder disc and interacting with said first pick-up pattern for generating a first control signal representative of angular velocity and rotational direction of said first encoder disc;
   a second pick-up device proximate to said second encoder disc and interacting with said second pick-up pattern for generating a second control signal representative of angular velocity and rotational direction of said second encoder disc; and
   a control unit connected electrically to said first and second pick-up devices and adapted to control output of the digital audio data read by the data reading device in accordance with the first and second control signals from said first and second pick-up devices so as to impart a scratch effect to the digital audio data.

7. The scratch effect control device as claimed in claim 6, wherein said driving unit includes an electromagnet, and a magnetic member disposed around said electromagnet, mounted on said lower platter member, and driven by said electromagnet to rotate about said axis when said electromagnet is excited.

* * * * *